United States Patent [19]

Silvestri

[11] 4,146,345

[45] Mar. 27, 1979

[54] APPARATUS FOR AND METHOD OF SUPPORTING PIPELINES SUSPENDED OVER DEPRESSIONS IN THE SEA BED

[75] Inventor: Antonio Silvestri, San Donato Milanese, Italy

[73] Assignee: Saipem, S.p.A., Italy

[21] Appl. No.: 837,942

[22] Filed: Sep. 29, 1977

[30] Foreign Application Priority Data

Oct. 29, 1976 [IT] Italy .............................. 28848 A/76

[51] Int. Cl.² ......................................... E02D 27/46
[52] U.S. Cl. ..................................... 405/172; 405/188
[58] Field of Search .................. 61/113, 112, 107, 105, 61/110, 111, 69 R

[56] References Cited

U.S. PATENT DOCUMENTS

| | | | |
|---|---|---|---|
| 3,688,510 | 9/1972 | Keating | 61/107 |
| 3,765,184 | 10/1973 | Menard | 61/112 |
| 3,841,105 | 10/1974 | Cannon | 61/113 |

Primary Examiner—Jacob Shapiro
Attorney, Agent, or Firm—Morgan, Finnegan, Pine, Foley & Lee

[57] ABSTRACT

A device for and method of supporting a section of submerged pipeline over depressed portions of the sea bed such as ditches, fissures and the like, comprising an assembly of a pipe-clamping mechanism and two or more posts associated therewith, which are drivable into the sea bottom.

Hydraulically powered means also provided for manipulating the clamping mechanism and means are further provided for lowering and raising the assembly. A cheap, safe and reliable device and method are provided which is an improvement over conventional techniques which generally provide sand bags under the pipe section suspended over a depression in the sea bottom.

16 Claims, 4 Drawing Figures

APPARATUS FOR AND METHOD OF SUPPORTING PIPELINES SUSPENDED OVER DEPRESSIONS IN THE SEA BED

This invention relates to an apparatus for supporting a pipeline suspended over a depression in the sea bed and to a method of using the apparatus.

The sea bed is never completely flat, and always comprises obstacles of various types such as rock projections or fissures or depressions of a size or depth, when a pipeline would be in a suspended state.

As the laying of pipelines has been limited up to the present time to shallow water, it has been possible to avoid said natural obstacles on the sea bed by suitably changing the laying direction or by exploding any rock projections with dynamite, and to support the pipeline on the sea bed at any small depressions by simply using a certain quantity of bags of sand or other material which, lowered from the mother ship, are arranged by divers between the pipeline and the sea bed.

With the present requirement for laying pipelines on beds in deep water, it is no longer always possible to avoid said obstacles as the pipeline is unable to be laid accurately along the most suitable route because of the considerable depth and the inevitable strong underwater currents. The pipeline can in fact finish up some distance from the theoretical position, and may therefore find itself suspended over deep and wide depressions.

In laying pipelines on deep beds, the problem of supporting the pipeline on the sea bed at depressions or fissures using supports to prevent the suspended portion of pipeline from bending and giving rise to dangerous kinks or buckling, or to pipeline fractures, obviously becomes of considerable importance. Such supports must evidently differe considerably from the sand bags previously used.

The object of the present invention is to provide apparatus which, when lowered from a mother ship, allows efficient, reliable, rapid, economical and riskless installation of a support on the sea bed for a pipeline suspended over depressions in deep beds.

According to one aspect of the present invention, there is provided apparatus completely recoverable service module which is lowered from a mother ship by a support cable on to the submerged pipeline to be supported by making it slide along two parallel guide cables stretched between said ship and said pipeline to which they are clamped by small clamps, and by a release or support module releasably connected below said service module and provided with a central clamp for clamping around said pipeline by means of control levers, and two lateral support legs which, on command, are driven by gravity into the sea bed. The service module also includes means for its coupling to, and release from said support module, means for locking and releasing said lateral support legs of said support module and means for operating the control levers for said central clamp of said support module, the controls for said means being all centred on a single control panel situated on one side of said service module.

In this manner, as the entire service module complete with its control devices is recovered when the support operation is terminated, and may therefore be re-used for subsequent operations once coupled to a further release or support module, considerable economy is obtained in the pipeline support operations. On the other hand, as the entire apparatus has two operating modules perfectly guided on to the pipeline precisely at the point in which this latter is to be supported, and as all the controls are centred in a single position, the support operation can be carried out with considerable accuracy and operating simplicity.

According to a further characteristic of the present invention, said release or support module has a beam of circular cross-section disposed orthogonally to the pipeline to be supported, and comprises two upwardly spaced-apart locator supports for the service module, and two spaced-apart vertical brackets provided with an eyelet. The beam further supports in a lower central region the two jaws of said central clamp, each of which is hinged to the two sides of said beam, and at its ends two vertical guides for said two lateral support legs, and two vertices of a rhomboidal frame formed from four pipe portions, the remaining two vertices of which each support a fork structure for the support module on the pipeline.

In this manner, the presence of said spaced-apart locator supports and said fork structures, ensures that said centered clamp is perfectly centred over the pipeline to be clamped.

According to a further characteristic of the invention, said control levers for said central clamp comprise two like systems which act on said jaws of the central clamp at the two sides of said circular cross-section beam of the support module. Each control lever has two links hinged at one end to the central clamp jaws and at the other end hinged together and to one end of a vertical connecting rod, the other end of which is hinged to one arm of a L lever pivoted to said circular cross-section beam of the support module. The other arm of said L lever is acted upon by a strong retention spring supported by said beam in the sense of keeping the central clamp jaws closed, and includes a through control pin connected to the corresponding L lever of the other system. In this manner, when in the rest state, the jaws of the central clamp are kept closed by said springs. The closure is further ensured by the fact that said links hinged together are disposed slightly inclined downwards such that a consistent force is necessary to rotate them upwards for opening the jaws.

According to a further characteristic of the invention, the two said lateral support legs retained by said locking and release means of the service module between said vertical guides situated at the ends of said circular cross-section beam of the support module are each terminates in a pointed cylinder provided with a shoulder ring, spaced therefrom. The cylinder also is provided on one side with a rack which cooperates with a counter-weighted pawl supported at the lower end of said vertical guide.

In this manner, once each lateral support guide has been released from said locking and release means, it is obliged to slide downwards by gravity along its vertical guide and to then penetrate into the marine bed, the depth of penetration, especially in muddy or sandy beds, being limited by said shoulder ring, and once it has penetrated, said leg is automatically locked to the support module by said pawl which, because of its counter-weight, becomes inserted into one of the teeth of said toothed rod of the leg.

A further characteristic of the invention is that said service module is has a rectangular box disposed in a like manner to said circular cross-section beam of the support module and of a length such as to allow it to be inserted between said eyelet-containing vertical brackets of said beam. On its bottom the box has spaced-apart locator pins which cooperate with said locator supports of said beam. On its upper portion the box includes a ring for coupling to said support cable. A transverse frame composed of four rods which extends from both sides of the box, grouped together into two vertices on which are supported two guide sleeves into which are inserted said parallel guide cables. To one side of said box there is fixed by locking plates a U beam of rectangular cross-section, the flanges of which face the outer edges of said vertical guides for said support legs of the support module.

According to a further characteristic of the present invention, said service module is provided with hydro-pneumatic accumulators for the energy necessary for operating said means, said accumulators being supported by said service module box on that side thereof opposite the side to which said U beam is fixed.

In this manner, the apparatus is both self-contained and self-sufficient, and thus any feed connection with the mother ship is dispensed with.

According to a further characteristic of the invention, said means for coupling said support model to, and releasing it from said service module consists of two double acting hydraulic cylinders arranged inside said service module box and supported from the sides thereof. The pistons of the cylinders are inserted into said eyelet of said spaced-apart vertical brackets of the release or support module.

In this manner, the support module is rigidly coupled to the service module, and its release may easily be attained by withdrawing the pistons of said cylinders from said eyelets.

According to a further characteristic of the invention, said means for locking and releasing said lateral support legs of said support module consist of two double acting hydraulic cylinders supported at the lower ends of said flanges of said U beam of the service module. The pistons, of these cylinders pass through suitable slots provided in the outer edges of said vertical guides of the support module, being inserted into a bore provided in said racks of the support legs.

Thus to release the legs, the pistons of said cylinders are completely withdrawn such that they leave both the bores and said slots.

According to a further characteristic of the invention, said means for operating the control lever systems for said central clamp of the support module consists of a double acting hydraulic cylinder supported in said service module box, and on the pistion of which is fixed a sleeve which, guided upwardly by a guide fixed to said box, comprises lower a fork cooperating with said through pin for controlling said lever systems.

By moving the hydraulic cylinder piston and consequently the fork sleeve in a direction opposing the direction of the retention springs of said lever systems, said L levers, connected together by said through pin inserted into the sleeve fork, are obliged to rotate in opposition to said retention springs, causing said vertical connecting rods to rise and to rotate said links upwards, with consequent opening of the central clamp jaws.

On the other hand, as the lever systems of the support module are connected to the operating means for the service module via a simple pin-fork system, it is apparent that there is no obstacle to the recovery of the service module as said fork becomes decoupled from said pin by the effect of the lifting of the service module.

A further characteristic of the present invention is that said single control panel situated on one side of said service module is supported by a vertical rod provided with holes and which can slide along a guide provided with slide wheels and supported at one end of said U beam of the service module, the sliding of said rod being limited by a shoulder pin inserted into one of said holes in the rod.

In this manner, the control panel may always be adjusted to the most suitable position for facilitating the work of the diver or the articulated arm of a submarine, even in the presence of roughness or heavy inclination of the sea bed.

Finally, according to a further characteristic of the present invention, the method for installing a support for a pipeline suspended over a depression in deep beds from a mother ship includes coupling two parallel guide cables, tautly unwound from winches situated on board the mother ship, to the submerged pipeline by clamps at the point in which said pipeline is to be supported; lowering the apparatus (service and support modules) by means of a support cable operated by a winch also situated on the mother ship and guiding it by said guide cables until it is in proximity to said pipeline, with the central clamp held open by the hydraulic control cylinder for the service module clamp; supporting the suspended pipeline and deflecting it slightly upwards so that it does not become damaged or deformed by the weight of the apparatus to be laid thereon, by increasing the pull on said parallel guide cables by operating their winches from the support ship; laying the apparatus on the submerged pipeline supported by said parallel guide cables by operating the winch of said support cable from the mother ship; clamping the central clamp of the support module around the pipeline by operating from the control panel the lever which operates said hydraulic control cylinder for the clamp; releasing the two lateral support legs of the support module by operating from the control panel the operating lever for the hydraulic cylinders which lock the legs of the service module, so that the legs penetrate by gravity into the sea bed as far as their shoulder rings and become locked to the service module by the respective counter-weighted pawl; releasing the service module of the apparatus from the support module now clamped by its central clamp to the submerged pipeline and supported by its lateral legs, by operating from the control panel the operating lever for the hydraulic cylinders for coupling the support module to the service module; recovering the released service module by operating the winch of said support cable from the mother ship, and finally recovering the two guide cables by opening the relative clamps and operating the respective winches from the mother ship.

The invention is described in greater detail hereinafter with reference to the accompanying drawings which illustrate a preferred embodiment. It is to be understood modifications may be made thereto without departing from the scope of the present invention.

Figure 1:
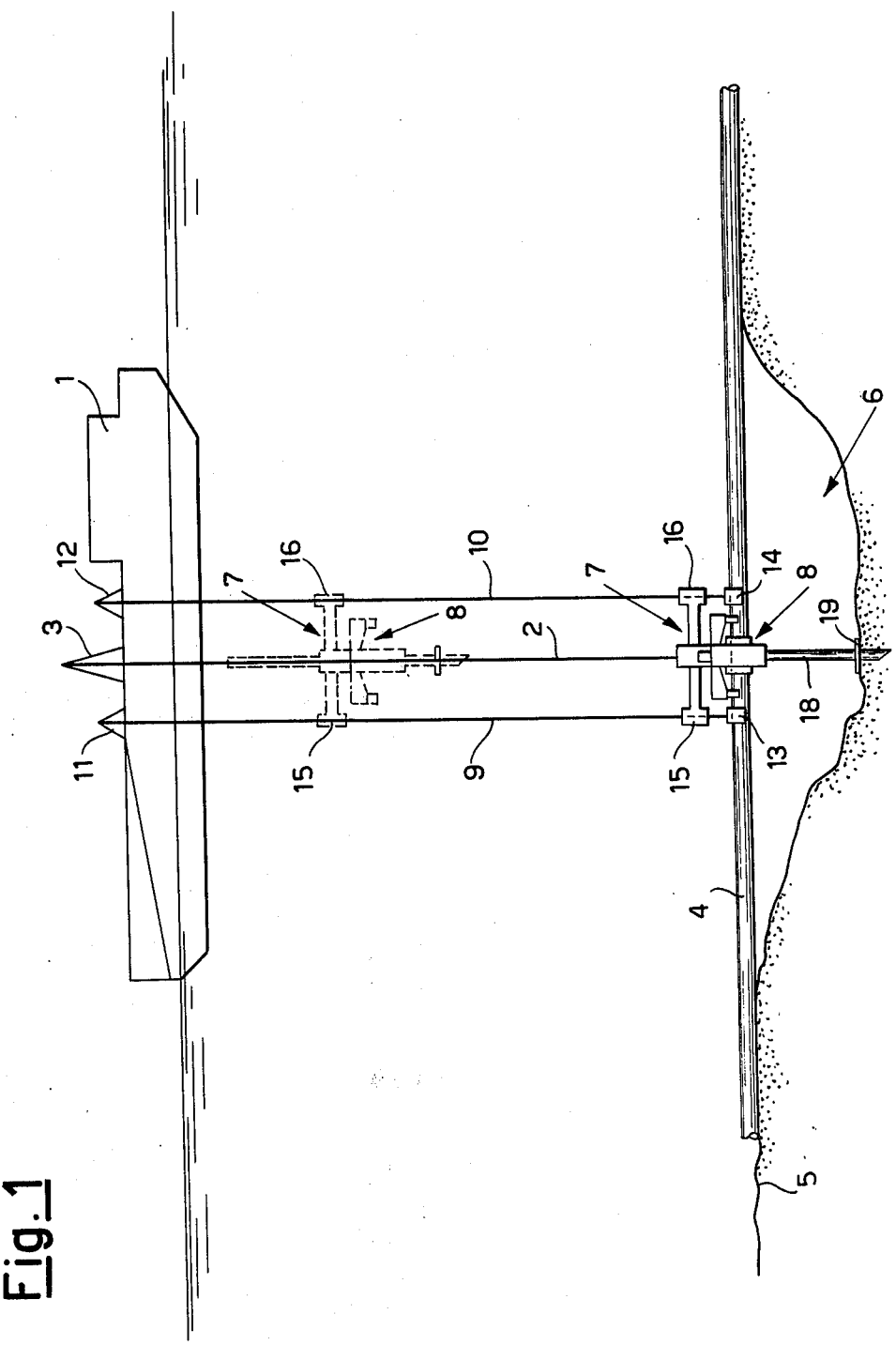
FIG. 1 illustrates diagrammatically the installation from a mother ship of a support on the sea bed for a pipeline suspended over a depression in deep beds, in accordance with the method of the invention and using an apparatus according to the invention.

With reference to the figures, the reference numeral 1 indicates a surface mother ship from which a support apparatus is lowered on to the pipeline 4 resting on the sea bed 5 at a depression 6, by means of a support cable 2 connected via a crane or davit 3 to the drum of a winch, not shown, of said ship. The apparatus, according to the invention, includes a recoverable service module 7 and a release or support module 8 releasably connected below said service module.

The apparatus 7, 8 is guided downwards on to the submerged pipeline 4 by two parallel guide cables 9 and 10, stretched between the ship 1, on which they are connected via the cranes or davits 11 and 12 respectively to the drums of a further two winches, also not shown, and the pipeline 4 to which they are fixed by the small clamps 13 and 14 respectively about the cables 9 and 10 are guide sleeves, 15 and 16 respectively, contained by the service module 7 of said apparatus.

In FIG. 1 the apparatus is indicated by dashed lines during the immersion stage and by full lines when the operation is finished, i.e. when the service module 7 can be released from said support module and recovered, with the support module 8 resting on the pipeline 4 and clamped thereto and supported by its two lateral support legs 17 and 18 (in FIG. 1 only one leg is visible, the other being in an opposing position) driven into the bed of the depression 6 as far as their shoulder rings 19.

Figure 2:
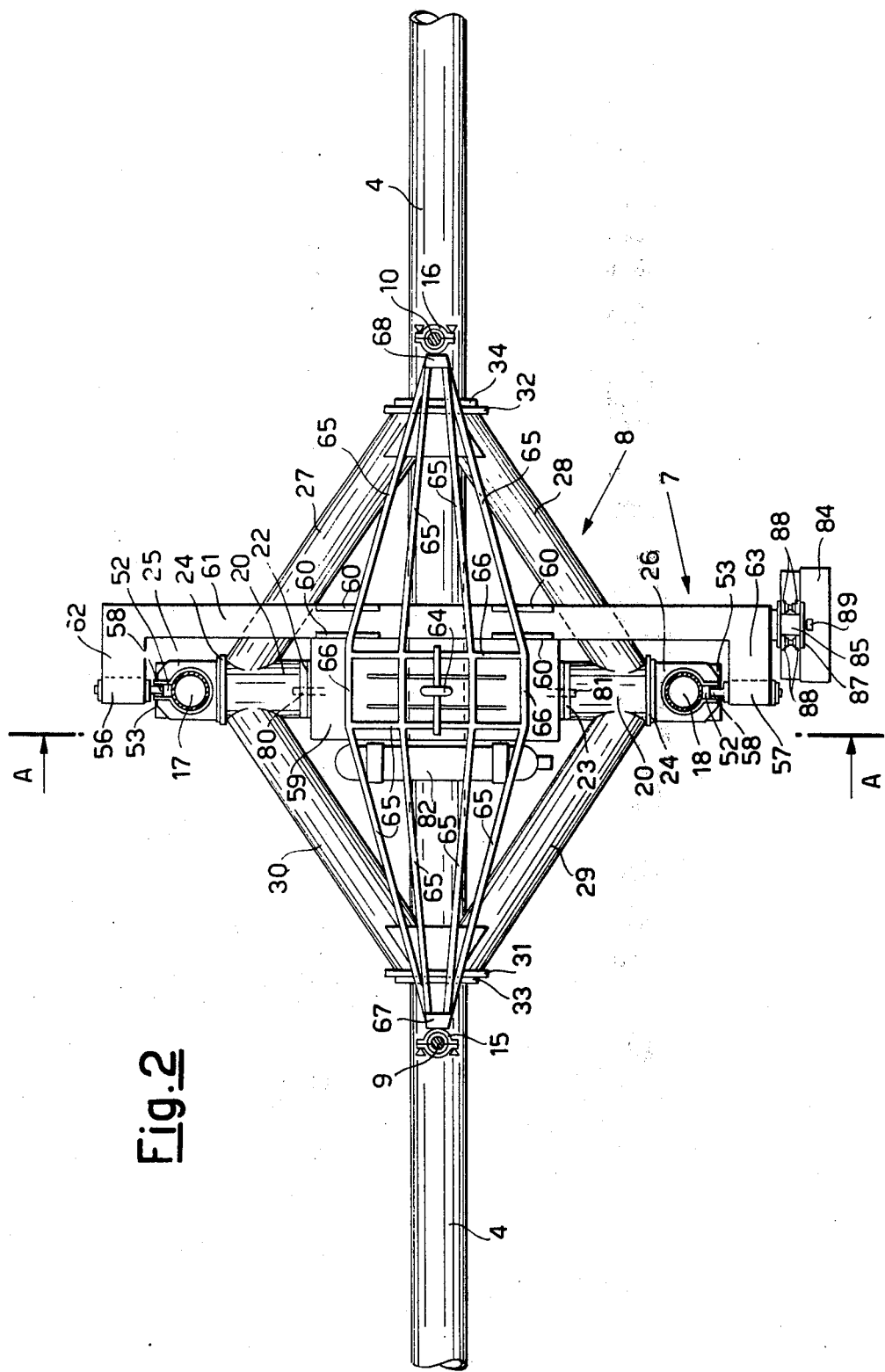
FIG. 2 is a plan view of the apparatus, complete with the service module and release or support module already laid on the pipeline to be supported, according to the invention.
Figure 3:
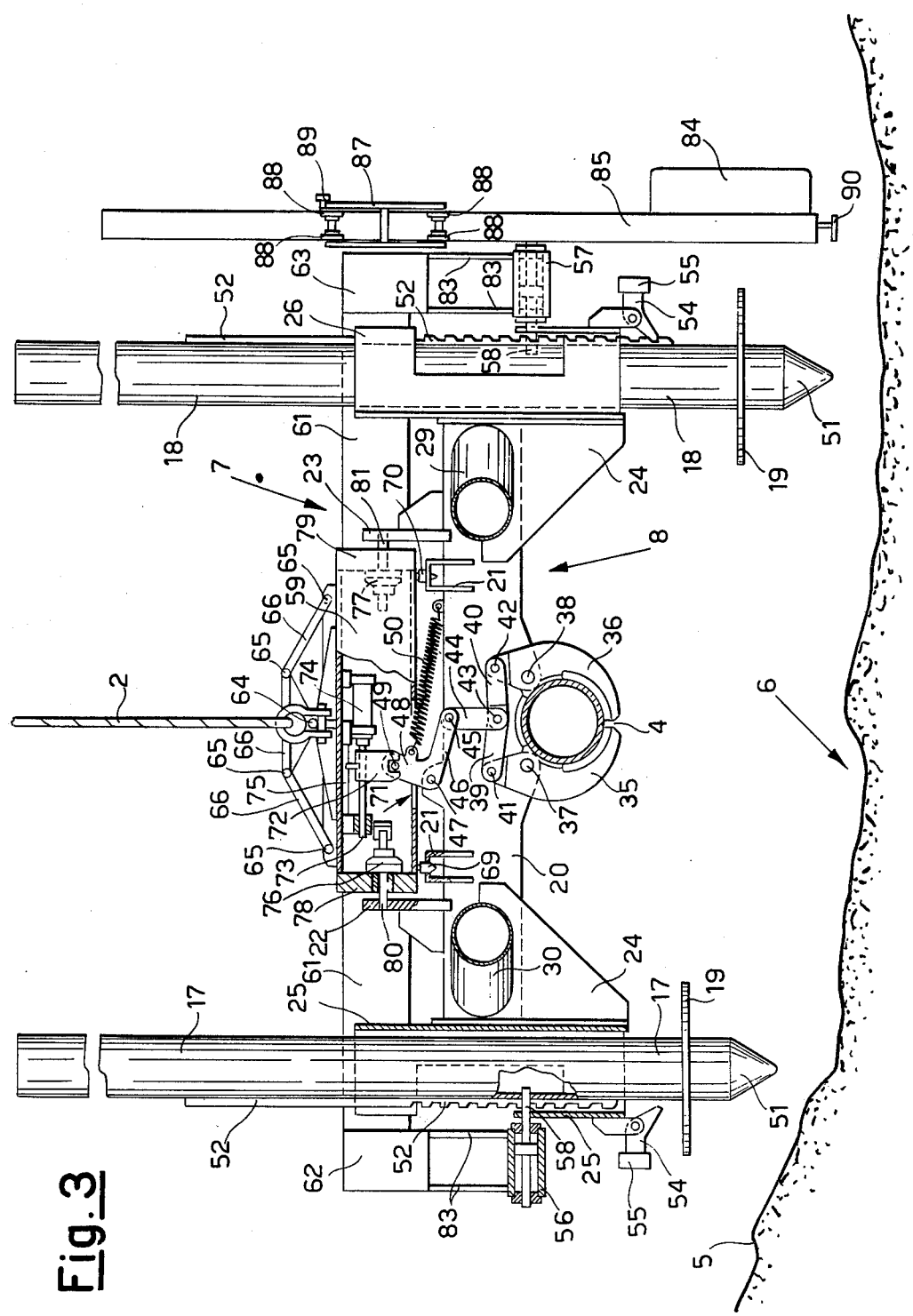
FIG. 3 is an end view on an enlarged scale, of the apparatus according to the invention taken along the line AA of FIG. 2.
Figure 4:
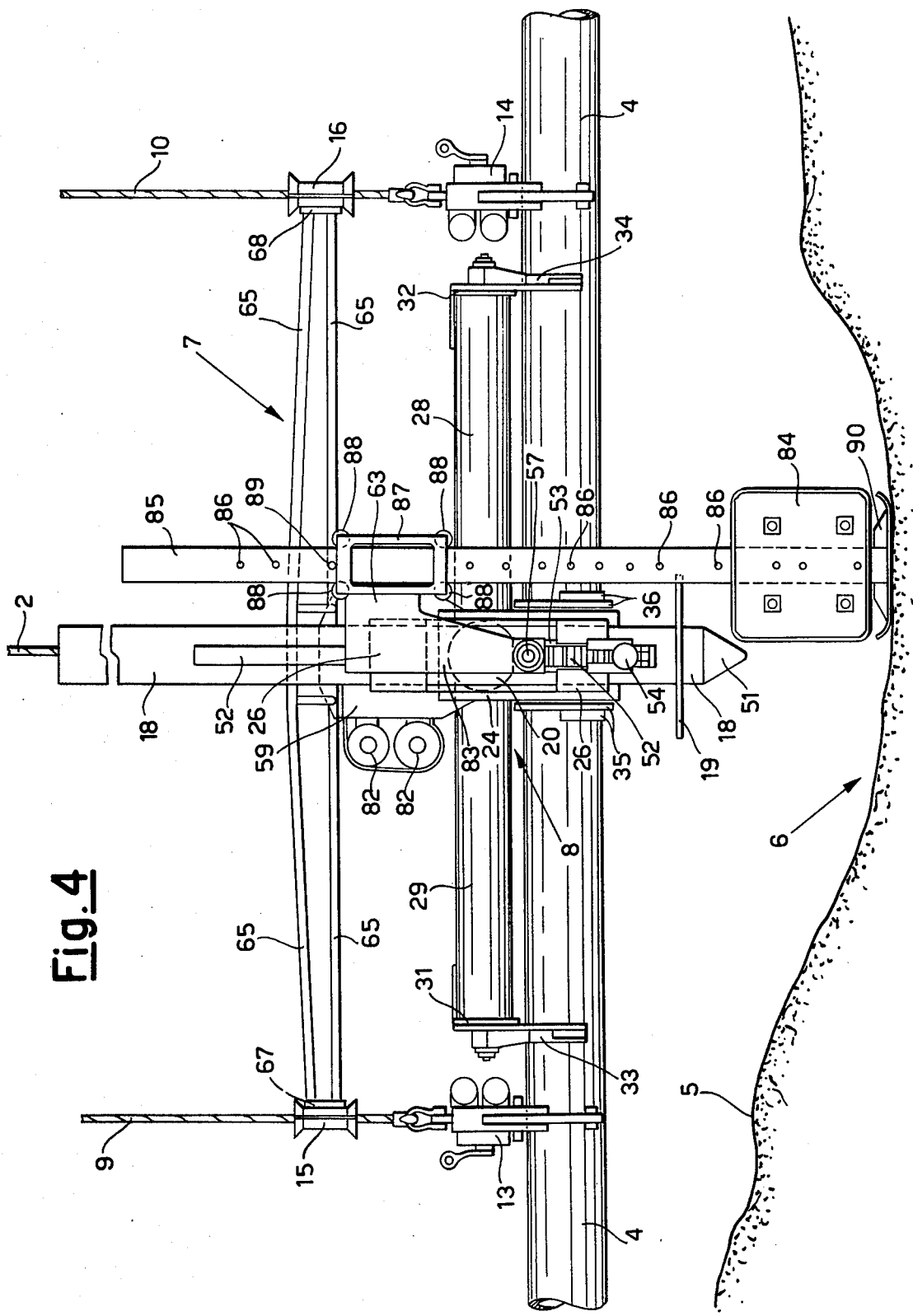
FIG. 4 is a side view on an enlarged scale, of the apparatus of FIG. 2 looking towards the control panel side.

The release or support module 8, which is releasably connected below the service module 7 of the apparatus, is has a beam 20 of circular cross-section disposed orthogonally to the pipeline 4 to be supported, and comprises upwardly two spaced-apart locator supports 21 (see FIG. 3) for the service module, and two spaced-apart vertical brackets 22 and 23 provided with an eyelet. By means of support plates 24, said beam 20 supports at its opposite ends (i) two vertical guides, 25 and 26 respectively, for said two lateral support legs 17 and 18, and (ii) two vertices (see FIG. 2 specifically), welded thereto, of a rhomboidal frame formed from four pipe portions 27, 28, 29 and 30, the remaining two vertices 31 and 32 each supporting a fork structure, 33 and 34 respectively, for centering and supporting the support module 8 on the pipeline 4. The beam 20 is also provided in a lower region with a central clamp for clamping to the pipeline, constituted by two jaws 35 and 36 which, hinged by pins 37 and 38 respectively to opposite sides of said beam, are operated by two similar control lever systems situated on the opposite sides of the beam 20 and each constituted (FIG. 3 shows only one system, the other being in an opposing position) by two links 39 and 40 hinged at 41 and 42 respectively to the upper ends of said jaws, and at 43 together and to the end of a vertical connecting rod 44, the other end of which is hinged at 45 to one arm 46 of a L lever pivoted at 47 to said beam 20. The other arm 48 of said L lever supports a through control pin 49 connected to the corresponding L lever of the other system. The arms 48 of the two levers are operated by a strong retention spring 50 supported by the beam 20 in the sense of keeping the jaws 35 and 36 of the central clamp closed. The two said links 39 and 40 of each system are sized such that with the jaws closed as shown in FIG. 3, they are inclined downwards at their common hinge 43.

Into said vertical guides 25 and 26 are inserted the lateral support legs 17 and 18, each of which has a cylinder terminating at its lower end in a point 51 and a shoulder ring 19 at a certain distance from its point 51. The legs 17 and 18 are also provided on their outside with a rack 52 which can slide along a vertical slot 53 provided in the outward facing side of the vertical guides 25 and 26, and which cooperates with a pawl 54 counter-weighted by the weight 55 and rotatably supported at the lower end of outward facing region of vertical guides 25 and 26. The legs 17 and 18 are kept within the respective vertical guides 25 and 26 by two double acting hydraulic cylinders 56 and 57 which are supported by the service module and which have their piston rods 58 inserted into a hole provided in said racks 52 passing through said vertical slots 53.

The recoverable service module 7 of the apparatus has a rectangular box 59 insertable lengthwise between the vertical brackets 22 and 23 of the support module 8 to one side of which are locking plates 60 (see FIG. 2) which fix a U beam 61 of rectangular cross-section, the flanges 62 and 63 of which face the outer sides of the vertical guides 25 and 26 respectively of the support module 8. The box 59 is provided on its upper part with a ring 64 for coupling to the support cable 2, and with a transverse frame having four rods 65 which, extending from opposite sides of the box, start from a trapezoidal central frame 66 fixed to the box, converge together into two vertices, 67 and 68 respectively, on which are supported said guide sleeves 15 and 16 for the parallel guide cables 9 and 10. On the bottom of the box 59 are provided two spaced-apart locator pins 69 and 70 which cooperate respectively with said two spaced-apart locator supports 21 of the support module 8, and an apeerture 71 (see FIG. 3) into which the arms 48 of the L-shaped levers of the two operating systems for said central clamp are inserted, and which are connected together by said through control pin 49. On said pin 49 is mounted the fork of a sleeve 72 (see FIG. 3) which is fixed to the piston 73 of a hydraulic double-acting cylinder 74 supported in said box 59, and guided upwardly by a guide 75 fixed to said box 59.

The box 59 and consequently the entire service module 7 is releasably connected to the support module 8 by two hydraulic double acting cylinders 76 and 77 which, supported in the box on opposing side walls 78 and 79, have their pistons 80 and 81 inserted into the eyelet of said vertical brackets 22 and 23 respectively of the support module 8.

On that side of the box 59 opposite the side to which said U beam 61 is fixed, there are provided hydropneumatic accumulators 82 to supply the energy necessary for operating all said hydraulic double acting cylinders. The hydraulic double acting cylinders 56 and 57 for locking said lateral support legs 17 and 18 between the respective vertical guides 25 and 26 are supported by brackets 83 at the upper ends of said flanges 62 and 63 respectively of said U beam 61. The controls for said hydraulic cylinders are all centered on a single control panel 84, which is supported by a vertical rod 85 provided with holes 86, and which can slide vertically along a guide 87 provided with slide wheels 88 and supported at one end of said U beam 61, the sliding of the rod 85 being limited by a shoulder pin 89 inserted into one of said holes 86 in the rod.

The figures also show a skid 90 for supporting the rod 85 on the sea bed 5. The skid 90 serves to prevent the rod 85 from penetrating into a muddy or sandy bed, with consequent, positioning of the control panel, which is uncomfortable for the operator, following a mistaken evaluation of the distance between the submerged pipeline 4 and bed 5.

Having generally set forth the method of invention, such method will now be described using the reference numerals for the apparatus just described and illustrated in the drawings.

Imagine, first, that a pipeline 4 has been observed to be unsupported over a depression 6 in the sea bed 5. The two clamps 13 and 14 are then secured to the pipeline 4, the clamps (as shown) being spaced apart by an appropriate distance.

The guide cables 9 and 10 are then secured under tension between the cranes or davits 11 and 12 and the clamps 13 and 14, which has the effect of deflecting the pipeline slightly upwards. Initially, the support module 8 is secured to the service module 7, with the pistons 80 and 81 located in the eyes of the vertical brackets 22 and 23. Moreover, the support legs 17 and 18 are secured within their vertical guides 25 and 26 by means of the pistons 58, and the jaws 35 and 36 are open to allow entry of the pipeline 4 between the jaws 35 and 36.

With the apparatus in this condition the apparatus is lowered by the cable 2 from the crane or davit 3 on the surface vessel 1. When the support module 8 (with the service module 7 still attached above it) approaches the pipeline 4, the support module 8 is correctly aligned with the pipeline 4 with the aid of the forks 33 and 34. The jaws 35 and 36 are closed by causing the piston 73 and sleeve 72 to move to the right (see FIG. 3) by actuation of the cylinder 74.

The cylinders 56 and 57 are then actuated, by a control from the control panel 84, to cause the pistons 58 to be withdrawn from the holes in the racks 52 and support legs 17 and 18, thereby allowing the legs 17 and 18 to fall under their own weight until the shoulder rings 19 abut the surface of the sea bed 5. The pawls 54 and weights 55, acting in cooperation with the racks 52 lock the legs 17 and 18 in position.

With the jaws 35 and 36 securely gripping the pipeline 4 and with the support legs 17 and 18 firmly embedded in the sea bed 5 and hence supporting the pipeline 4, the service module 7 can be released from the support module 8. This is effected by actuation of the cylinders 76 and 77 to cause the pistons 80 and 81 to be withdrawn from the eyes in the vertical brackets 22 and 23.

If the cable 2 is then hauled in aboard the mother ship 1 the entire service module 7, as well as the control panel 84 can be recovered, thereby leaving on the sea bed only the support module 8 with the support legs 17 and 18 embedded in the sea bed 5. Also the clamps 13 and 14 can be released from the pipeline 4, and recovered by winding in the cables 9 and 10. Thus much of the apparatus can be recovered, particularly all of the cylinder arrangements including the cylinder 74, as the sleeve 72 can be moved vertically upwards and away from the pin 49 which is still urged towards the right (see FIG. 3) by the tension spring 50. Obviously, during upward movement of the service module 7 relative to the support module 8, the locator pins 69 and 70 are withdrawn from the location holes in the locator supports 21 which form part of the support module 8.

Thus, much of the apparatus is available for re-use, and can be re-used to assist in the positioning of a further support module 8 at a different location.

What we claim is:

1. An apparatus for use in supporting a pipeline suspended over a depression in a sea bed which can be lowered to and from the pipeline from a mother ship by a cable and parallel guide cables, comprising:
    (a) a recoverable service module adapted to be lowered from a mother ship by a support cable to the submerged pipeline to be supported, the service module having guides slidable along two parallel guide cables stretched in use between the mother ship and the pipeline; and
    (b) a support module releasably connected below said service module to the pipeline, and at least two support legs adapted to be extended into the sea bed;
    wherein said service module includes coupling means for coupling it to, and release from, said support module, locking means for locking and releasing said support legs relative to the support module, and actuating means for operating the clamp of the support module for clamping said support module to the pipeline and for causing said legs to be released for extension into the sea bed and support of the pipeline.

2. An apparatus according to claim 1, wherein the clamp of said support module is centrally located and is actuatable by a system of levers carried by said support module, which levers, when said service and support modules are connected together, are linked to said actuating means on said service module.

3. An apparatus according to claim 2, wherein said support legs are laterally disposed with respect to said clamp, such that with said clamp secured to a pipeline said legs extend on either side of the pipeline.

4. An apparatus according to claim 3, which also includes a control panel containing controls for said coupling means, locking means and actuating means.

5. An apparatus according to claim 4, wherein said control panel is disposed on one side of the service module.

6. An apparatus according to claim 5, wherein said support module includes a beam disposed orthogonally to the pipeline to be supported, the beam being provided with at least two upwardly directed, spaced-apart locator supports for locating said service module and with at least two spaced-apart vertical brackets each provided with an eye; wherein said beam supports on its lower side in the region of its midpoint two jaws of said clamp, each of which jaws is hinged to two opposing sides of said beam, and supports at its end region two guides for said support legs and two vertices of a four-sided frame formed from four tubular members, the remaining two vertices of which each suport a fork intended for aligning said beam of said support module with the pipeline.

7. An apparatus according to claim 6, wherein said clamp has a system of two like sets of levers which act on said jaws of said clamp on the two opposing sides of said beam of said support module, each set having two links hinged at one end to the clamp jaws and hinged together at the other end and to one end of a common connecting rod, the other end of which is hinged to one arm of a bent lever pivoted relative to said beam of said support module, the other arm of said bent lever being urged by a tension spring secured to said beam in that direction tending to keep said clamp jaws closed, and said other arm being secured by a pin to the corresponding arm of the other set.

8. An apparatus according to claim 6, wherein each of said support legs is cylindrical, is tapered at its lower end, is provided at a certain distance from its lower end with a shoulder ring, and is provided over part of the cylindrical region with a rack adapted to cooperate with a counter-weighted pawl supported at a lower end region of said respective guide.

9. An apparatus according to claim 8, wherein the service module includes a rectangular box adapted, with the service and support modules connected together, to be disposed parallel to the beam of said support module and to be inserted between said eye-containing vertical brackets of said beam, and wherein said box is provided in a lower region with spaced-apart locator pins adapted to cooperate, with said locator supports of said beam and in an upper region with a ring for coupling to a support cable; said service module also including a transverse frame composed of a plurality of rods which, extending from both sides of said box, converge to two vertices on which are supported said two guides for said parallel guide cables, wherein to one side of said box there is secured a second beam having at its ends arms perpendicular to said second beam, which arms face the outer edges of the guides for said support legs.

10. An apparatus according to claim 9, wherein said service module includes hydro-pneumatic accumulators for the energy necessary for operating said actuating means, said locking means and said coupling means; said accumulators being supported by said box of said service module on that side thereof opposite the side on which said second beam is secured.

11. An apparatus according to claim 10, wherein said coupling means for coupling said support module to, and releasing it from, said service module comprises two double-acting hydraulic cylinders arranged inside said service module box and supported by the sides thereof, the pistons of said cylinders being insertable in the eyes of said spaced-apart vertical brackets of said support module.

12. An apparatus according to claim 8, wherein said locking means for locking and releasing said support legs of the support module comprises two double-acting hydraulic cylinders supported at the lower end regions of said arms of said beam of the service module, the cylinders having pistons adapted to pass through slots provided in an outward facing region of said guides of said support module and for insertion in a bore in the racks of said support legs.

13. An apparatus according to claim 9, wherein said actuating means for operating said clamp of said support module comprises a double-acting hydraulic cylinder supported in said service module box, the piston of said cylinger having fixed thereon a sleeve which in an upper region cooperates with a guide fixed to said box, and in a lower region has a fork adapted to cooperate with said pin connecting said two sets of levers.

14. An apparatus according to claim 9, wherein said control panel situated on one side of the service module is supported by a vertical rod provided with holes and which can slide along a guide provided with wheels and supported at the free end region of one arm of said beam of the service module, the movement of said rod being limited by a pin insertable in one of the holes in the rod.

15. A method of installing from a mother ship a support on the sea bed for a pipeline suspended over a depression in the sea bed, comprising:
coupling two parallel guide cables extending from the mother ship, to the submerged pipeline;
lowering apparatus by means of a support cable from the mother ship, down the guide cables until it is in the proximity of the pipeline, the apparatus including a service module and a support module connected thereto, with a clamp held open by the actuating means, wherein said service module includes coupling means for coupling it to, and release from, said support module, locking means for locking and releasing said support legs relative to the support module, and actuating means for operating the clamp of the support module for clamping said support module to the pipeline and for causing said legs to be released for extension into the sea bed and support of the pipeline;
deflecting the suspended pipeline slightly upwards by increasing the tension on the parallel guide cables by taking up those cables on the mother ship;
laying the apparatus on the submerged pipeline supported by the parallel guide cables;
clamping the clamp of the support module to the pipeline by operating the locking means;
releasing the service module of the apparatus from the support module now clamped by its clamp to the submerged pipeline and supported by its support legs, by operating the coupling means;
recovering the released service module by taking up the support cable on board the mother ship; and
recovering the two guide cables by uncoupling the same from the pipeline and taking up the cables on board the mother ship.

16. A method according to claim 15, wherein the guide cables are secured to the submerged pipeline by releasable clamps.

* * * * *

UNITED STATES PATENT AND TRADEMARK OFFICE
CERTIFICATE OF CORRECTION

PATENT NO. : 4,146,345
DATED : March 27, 1979
INVENTOR(S) : Antonio Silvestri

It is certified that error appears in the above-identified patent and that said Letters Patent are hereby corrected as shown below:

Col. 1, line 11, Before "size" insert --various--.

line 12, Correct "when" to read --where--.

line 35, After "or" insert --even--.

line 45, After "apparatus" insert --including a--.

line 47, After "cable" delete "on".

Col. 2, line 19, After "for" insert --centering and supporting--.

line 23, After "said" insert --central--, delete

"centered", and correct "centred" to read

--centered--.

UNITED STATES PATENT AND TRADEMARK OFFICE
CERTIFICATE OF CORRECTION

PATENT NO. : 4,146,345
DATED : March 27, 1979
INVENTOR(S) : Antonio Silvestri

It is certified that error appears in the above-identified patent and that said Letters Patent are hereby corrected as shown below:

Col. 2, line 66, After "module", "is" should be deleted.

Col. 3, line 6, After "which" insert a comma --,--.

line 54, After "comprises" delete "lower" and insert --lower-- before "fork".

Col. 4, line 37, Delete "from".

line 38, Delete "the control panel" and after "lever" insert --from the control panel--.

Col. 5, line 26, After "respectively" insert a period --.--, and correct "about" to read --About--.

line 40, Delete "is".

UNITED STATES PATENT AND TRADEMARK OFFICE
CERTIFICATE OF CORRECTION

PATENT NO. :   4,146,345
DATED      :   March 27, 1979
INVENTOR(S) :  Antonio Silvestri It is certified that error appears in the above-identified patent and that said Letters Patent are hereby corrected as shown below:

Col. 5, line 42, Delete "upwardly" and after "two" insert --upwardly--.

line 54, After "lower" insert --central--.

Col. 6, line 24, After "8" insert a semi-colon --;--.

lines 39 and 40, Correct spelling of "aperture".

Col. 7, line 6, After "consequent" delete the comma ",".

Col. 8, line 44, Correct "Claim 5" to read --Claim 1--.

Col. 10, line 5, Correct spelling of "cylinder".

Signed and Sealed this

Twenty-fifth Day of September 1979

[SEAL]

Attest:

Attesting Officer

LUTRELLE F. PARKER
*Acting Commissioner of Patents and Trademarks*